UNITED STATES PATENT OFFICE.

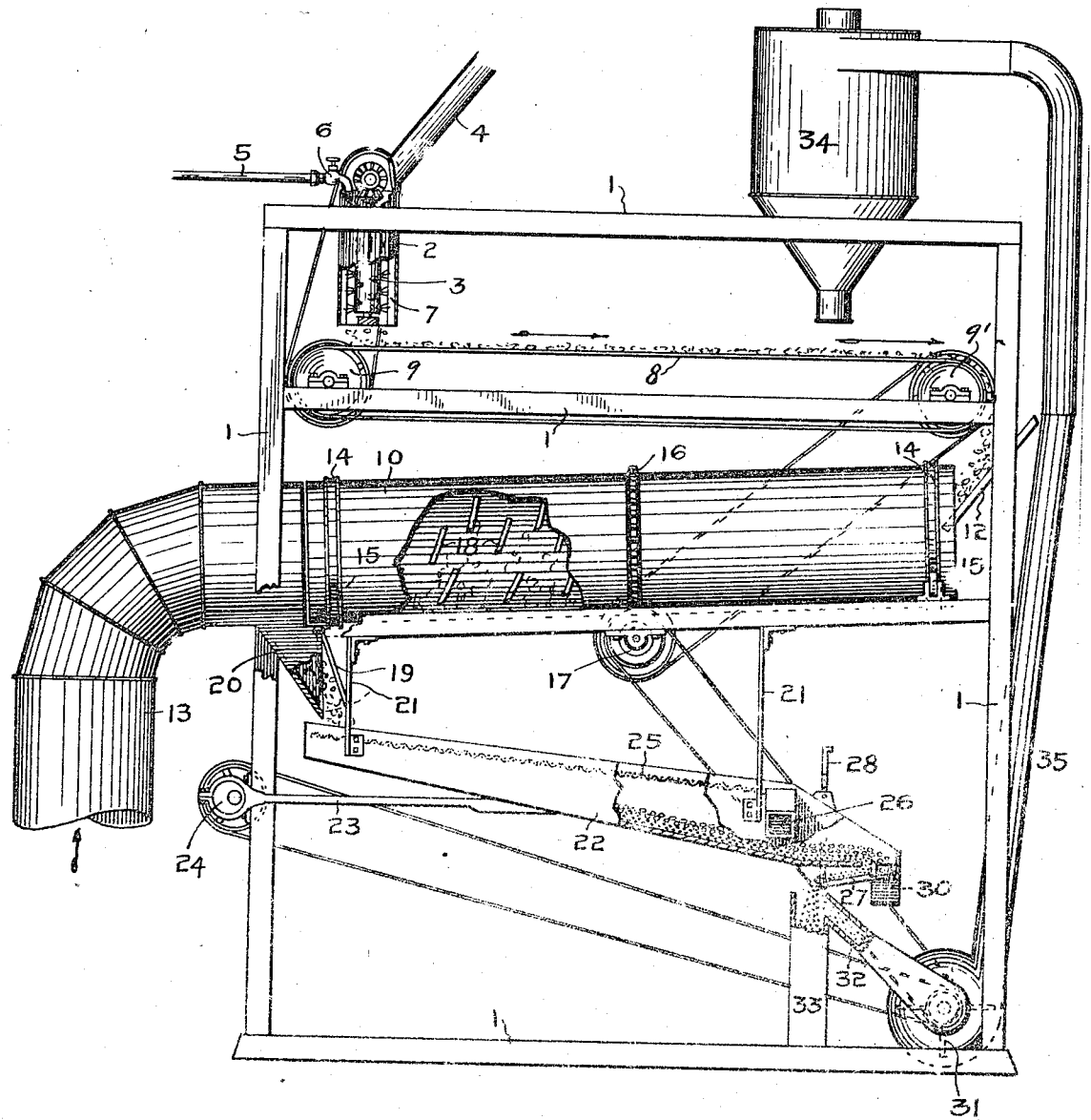

SHIRL HERR, OF CRAWFORDSVILLE, INDIANA, ASSIGNOR TO CRAWFORDSVILLE SEED COMPANY, OF CRAWFORDSVILLE, INDIANA, A FIRM COMPOSED OF ABNER H. FLANIGAN AND SHIRL HERR, OF CRAWFORDSVILLE, INDIANA.

SEED-CLEANING MACHINE.

1,216,803.  Specification of Letters Patent.  Patented Feb. 20, 1917.

Application filed July 10, 1916. Serial No. 108,490.

*To all whom it may concern:*

Be it known that I, SHIRL HERR, a citizen of the United States, residing at Crawfordsville, in the county of Montgomery and State of Indiana, have invented certain new and useful Improvements in Seed-Cleaning Machines, of which the following is a specification.

Clover, alfalfa and desirable crop-seeds are generally so mixed with buckhorn and other seeds of worthless weed-like plants as to endanger the crop-return from fields planted with such mixture. Many of the obnoxious seeds, of which the buckhorn is one, have a coating which becomes mucilaginous when moistened, while the desirable seeds are not so constituted, and the object of this invention is to provide a means for thoroughly moistening the mucilaginous coated seeds and adhering them to a granular material which will increase their bulk so they may be readily separated in this condition from the desirable seeds.

I accomplish the objects of this invention by the mechanism illustrated in the accompanying drawing, in which the complete machine is shown in operative position in side elevation, with some of the parts in partial vertical section.

Mounted at the top of a suitable frame 1, is a vertical cylindrical tube 2, within which is a vertical rotating brush 3. The mixed seeds to be cleaned are deposited through a tube 4, into the upper end of the tube 2, and water is simultaneously introduced through pipe 5, having a faucet 6, for regulating the supply. The sides of the tube 2 are preferably corrugated to form baffles 7, for the brushes to beat the seeds against to insure a thorough moistening of the latter.

The moistened seeds discharge by gravity through the lower open end of the tube 2, and are received upon a horizontal traveling apron 8. The apron 8 is an endless one which passes around a pair of horizontal drums 9, 9', on shafts which are journaled in boxes supported by the frame 1, and the two drums are sufficiently separated to afford a length of apron which by being moved slowly will give the moisture on the seeds time enough to soak into the coating of those like the buckhorn and make them gummy.

Below the apron is a revolving drum 10, and above it is a device 34, similar in construction and operation to the well known dust-collector, from which dry saw-dust, deposited therein as will hereinafter be described, is discharged to the apron. The travel of the apron is in the direction indicated by the arrows, and by the turn of the belt around the drum 9' the moist seeds, and saw-dust on it, will drop off. These droppings will be arrested by an inclined chute 12, supported below the drum 9' by the frame 1, and will be discharged into the drum 10 by the chute which enters it. A pipe 13, conveying hot air from any suitable source (not shown), discharges into the opposite end of the drum 10 from chute 12, and to increase the air-flow through the drum and also to accelerate the movement of the saw-dust and seeds through the drum in the opposite direction, the latter is inclined somewhat as shown. By the rotation of the drum the moistened seeds and dry saw-dust are tumbled together and are thoroughly mixed for the purpose of bringing every gummy seed into contact with a piece of saw-dust, to which it will adhere by reason of its nature, aided by the absorptiveness of the saw-dust in its dry condition.

The drum 10 has annular outside channels 14 which form tracks for rollers 15 supported by the frame 1, upon which rollers the drum is free to revolve. Near the middle of the drum is an outside annular row of worm teeth 16, engaged by a worm 17, on a rotating shaft extending transversely of the frame and supported by the latter.

Within the drum I prefer to place a plurality of inwardly projecting vanes 18 in spiral rows to move the seeds and saw-dust down the drum and for raising them and dropping them through the current of heated air to dry them, it being important that the time of exposure of the seeds to the heat of the air be of such short duration as not to injure their germinating qualities.

At the bottom of the section of the stationary hot-air pipe 13, next to the revolving drum 10, is an air-valve 19, at the mouth of an inclined chute 20, which allows the dried mixture to escape from the influence of the hot air without allowing the hot air to escape.

Suspended by spring straps 21 from the frame 1 is a shoe 22, which is connected by a pitman 23 with a rotating eccentric 24 and vibrated. This shoe has a wire screen 25, upon one end of which the discharge through chute 20 is received. The shoe and screen are elevated at the end where the chute discharges, and the constant vibration imparted to the former, work the discharged material down. The desirable crop-seeds, having no adherent saw-dust, pass freely through the screen, as also do some of the others which have gathered only very small particles of saw-dust, but the major portion of the undesirable seeds with larger adherent saw-dust particles move to the lower end of the screen and are tailed off through a laterally inclined spout 26.

The good seeds together with the mucilaginous seeds having insufficient saw-dust particles to hold them back, are deposited upon the floor of the shoe 22, and the latter, being bulkier and proportionately lighter than the good seeds will arrange themselves in a layer on top of the heavier good seeds under the vibratory action of the shoe. I take advantage of this re-arrangement to separate the mixture by skimming off the undesirable top layer as the good seeds are discharged through an opening at the lower end of the shoe-floor. The seeds passing through the latter opening are received upon a table 27 having an upwardly extending flange which limits the width of the discharge opening. The table is pivoted at the angle, and is adjusted up and down by a lever 28 which is held by a pin as shown. By adjusting the table and its flange the size of the opening is adjusted so as to allow the heavier good seeds to pass through, while those with adherent saw-dust tails over and is carried off through a lateral spout 30.

I have found by experience that practically all of the seed with adherent saw-dust are eliminated here that were not removed by the screen, but some of the unattached saw-dust which has passed through the screen passes down onto table 27 with the good seeds. This I remove by a suction fan 31, located below the table 27, and drawing air across the path of the mixed material dropping off of the sloping table, through a wind-trunk 32. The cleaned seed falls into the hopper 33 where it is taken care of in the usual way, and the saw-dust drawn out of it through the wind trunk and fan is discharged into a dust collector 34, at the top of the frame 1, through an air-trunk 35.

The dust collector 34 is of usual construction and operation and from its lower end the accumulated saw-dust is deposited again upon the wet seeds being carried by the apron 8. The deficiency of saw-dust entailed by its major portion being stuck to the mucilaginous seeds is supplied by shoveling it from time to time upon the wet seeds on the apron, or by depositing it in the dust collector.

I have described the operation of my invention so fully in connection with the description of its structure that further explanation is deemed unnecessary.

Having thus fully described my invention what I claim as new and wish to secure by Letters Patent of the United States, is—

1. In a machine for separating mucilaginous from non-mucilaginous coated seeds, means for moistening said seeds, means for subjecting them to the moisture until the coats of the mucilaginous seeds become adhesive, means for adding a material to which the adhesive seeds will adhere, means for tumbling and mixing said last material with the moistened seeds, means for drying the mixture in hot air, and means for separating said last material with its adhering seeds from the other seeds.

2. In a machine for separating mucilaginous from non-mucilaginous coated seeds, means for moistening said seeds until the coats of the mucilaginous ones are adhesive, means for adding a material to which the adhesive seeds will adhere, means for tumbling said last material and moistened seeds together in a current of hot air, and means for separating said last material with its adhering seeds from the other seeds.

3. In a machine for separating mucilaginous from non-mucilaginous coated seeds, means for moistening said seeds until the coats of the mucilaginous ones are adhesive, means for adding a material to which the adhesive seeds will adhere, means for mixing said last material with the moistened seeds, means comprising a rotating tube for drying the mixture in hot air, and means for separating said last material with its adhering seeds from the other seeds including a vibrator which arranges the masses in strata according to size and gravity, and means for separating the strata.

4. In a machine for separating mucilaginous from non-mucilaginous coated seeds, means for moistening said seeds until the coats of the mucilaginous ones are adhesive, means for adding a material to which the adhesive ones will adhere, means for tumbling said last material and the moistened seeds together in a current of hot air, and means for separating said last material with its adhering seeds from the other seeds including a vibrator which arranges the masses in strata according to size and gravity, and means for separating the strata.

5. In a machine for separating mucilaginous from non-mucilaginous coated seeds, means for wetting the seeds comprising a tube to which the seeds and water are supplied, said tube having inside projections, and a brush rotating in said tube and beating the seeds against the projections in combination with means for mixing a material with the wet seeds to which the adhesive ones will adhere, means for drying the mixture and means for separating the non-mucilaginous seeds from the rest of the mixture.

6. In a machine for separating mucilaginous from non-mucilaginous coated seeds, means for moistening said seeds until the coats of the mucilaginous ones are adhesive, and means for mixing a material with the wet seeds to which the adhesive ones will adhere and for drying the mixture comprising a rotating drum into which the wet mixture is introduced while a current of hot air is passed through the drum.

7. In a machine for separating mucilaginous from non-mucilaginous coated seeds, means for moistening said seeds until the coats of the mucilaginous ones are adhesive, means for mixing a material with the wet seeds to which the adhesive seeds will adhere and for drying the mixture comprising a rotating drum into which the wet mixture is introduced while a current of hot air is passed through the drum, and means in the drum to raise the mixture and drop it through the hot air current.

8. In a machine for separating mucilaginous from non-mucilaginous coated seeds, the combination, of means for moistening said seeds until the coats of the mucilaginous ones are adhesive, means for mixing a material with the wet seeds to which the adhesive seeds will adhere and for drying the mixture comprising a rotating drum into which the wet mixture is introduced while a current of air is passed through the drum, means for separating the non-mucilaginous coated seeds from the rest of the mixture, means for discharging the mixture from the drum to said separating means and an air-valve controlling said discharge.

In witness whereof, I have hereunto set my hand and seal at Indianapolis, Indiana, this 8th day of June, A. D. one thousand nine hundred and sixteen.

SHIRL HERR. [L. S.]